US012177286B2

(12) United States Patent
Mylavarapu et al.

(10) Patent No.: US 12,177,286 B2
(45) Date of Patent: Dec. 24, 2024

(54) REVERSE PROXY SERVER FOR REDUCING ERRORS DURING COMMUNICATION BETWEEN COMPUTER SYSTEMS

(71) Applicant: Capital One Services, LLC, McLean, VA (US)

(72) Inventors: Teja Swaroop Mylavarapu, McLean, VA (US); Hitesh Kapil, McLean, VA (US); Praveen Reddy Gagireddy, McLean, VA (US); Venkata Satya Sriram Kalyan Namuduri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/185,206

(22) Filed: Mar. 16, 2023

(65) Prior Publication Data

US 2024/0314193 A1 Sep. 19, 2024

(51) Int. Cl.
*H04L 67/02* (2022.01)
*H04L 67/56* (2022.01)

(52) U.S. Cl.
CPC .............. *H04L 67/02* (2013.01); *H04L 67/56* (2022.05)

(58) Field of Classification Search
CPC ................................ H04L 67/02; H04L 67/56
See application file for complete search history.

(56) References Cited

U.S. PATENT DOCUMENTS

2014/0006924 A1\* 1/2014 Tsolis .................... G06F 16/972
715/234

FOREIGN PATENT DOCUMENTS

| CN | 107332924 A | \* | 11/2017 | .......... H04L 61/1511 |
| CN | 107332924 B | \* | 6/2020 | .......... H04L 61/1511 |
| EP | 2874078 A1 | \* | 5/2015 | .......... G06F 17/2247 |
| GB | 2560221 A | \* | 9/2018 | ............. G06F 16/95 |

\* cited by examiner

*Primary Examiner* — Cheikh T Ndiaye
(74) *Attorney, Agent, or Firm* — Foley & Lardner LLP (57) ABSTRACT

A method and related system of operations include obtaining, from a client computing device, a request comprising a request header field that is populated with a first domain name and updating the request by modifying the request header field to comprise a second domain name. The method further includes sending the updated request to a server, receiving a response comprising a response header, and updating the response by modifying a response header field of the response header to indicate the first domain name as an origin domain of the response. The method further includes sending the updated response to the client computing device.

20 Claims, 3 Drawing Sheets

REVERSE PROXY SERVER FOR REDUCING ERRORS DURING COMMUNICATION BETWEEN COMPUTER SYSTEMS

SUMMARY

Electronic transactions can involve complex messaging interactions between multiple domains in internet communications. During a basic transaction, a user may interact with a client computing device to initiate a first series of exchanges with a first set of devices registered with a first domain. The first set of devices may then provide a confirmation with a target set of servers registered with a target domain. In many cases, the target set of servers may rejects requests from client computing devices indicated as coming from domains not stored in a collection of permitted domains, where the permitted domain name may be referred to as a whitelisted domain name in some embodiments. However, such rejections may interfere with necessary exchanges to complete various transactions. To overcome the risk of rejection, some embodiments may use a reverse proxy server to intercept or otherwise receive client-side messages, determine that they satisfy a set of security requirements, and modify the origin headers that to bypass one or more filters constructed to prevent non-permitted domains from accessing a computing device. However, in many cases, such modification can cause an outgoing response message to face cross-origin resource sharing (CORS) errors upon reaching the client computing device because the response message may in fact reduce CORS errors.

Some embodiments may overcome such client-side security hurdles when users receive modified responses that can overcome client-side security policies. For example, some embodiments may obtain, at a proxy server, a request having a header field populated with a non-permitted domain name from a client computing device. Some embodiments may then update the header field to indicate a whitelisted domain name if a set of criteria is satisfied, where the set of criteria may include a criterion that an application identifier provided by the request matches a target identifier. Some embodiments may then send the updated request to a destination server before receiving a response having a corresponding response header. To prevent the response from being rejected by the client computing device, some embodiments may then update the response by further modifying the response header to indicate the first domain name as an origin domain of the response. Having modified the response header to overcome a possible CORS handling error on the client computing device, some embodiments may enable client-side users to receive information from the destination server or another responding server instead of seeing a CORS-related error.

Various other aspects, features, and advantages will be apparent through the detailed description of this disclosure and the drawings attached hereto. It is also to be understood that both the foregoing general description and the following detailed description are examples, and not restrictive of the scope of the invention.

BRIEF DESCRIPTION OF THE DRAWINGS

Detailed descriptions of implementations of the present technology will be described and explained through the use of the accompanying drawings.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
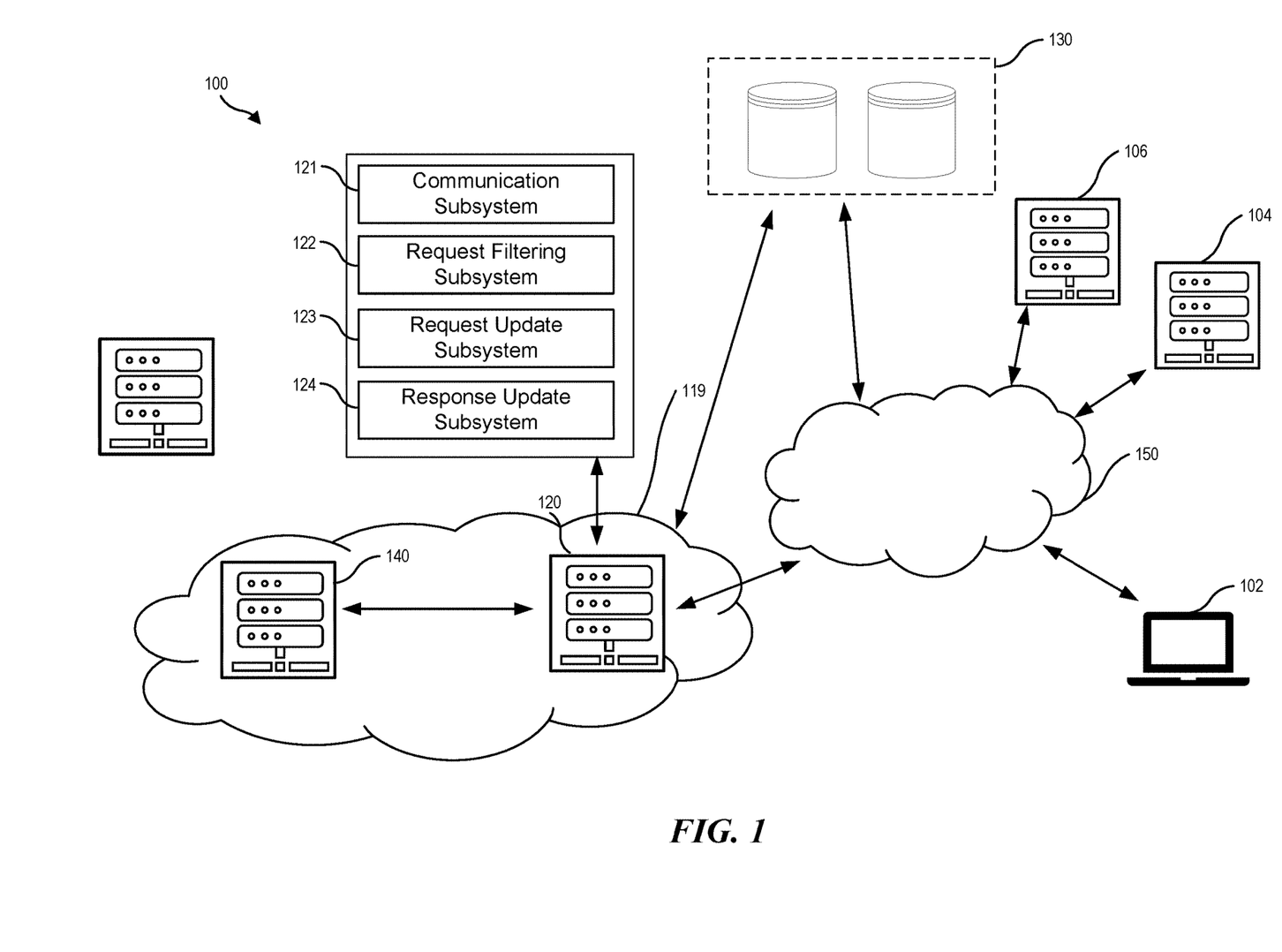
FIG. 1 depicts an example of a system for modifying message headers, in accordance with some embodiments.

FIG. 1 depicts an example of a system for modifying message headers, in accordance with some embodiments The example system 100 includes a client computing device 102 used by a first user. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The network 150 permits communication, including the sending and receiving of messages, between a client computing device 102, a merchant server 104, a payment server 106, a cloud-supported set of servers 119 that includes a reverse proxy server 120 and a destination server 140, or other computing systems. For example, the client computing device 102 may communicate with a merchant server 104 via the network 150, then communicate with a payment server 106 based on the results of interactions with the merchant server 104, and then communicate with the destination server 140 via the reverse proxy server 120 based on the results of interactions with the payment server 106.

The reverse proxy server 120 may include or have access to a set of non-transitory, computer-readable media (e.g., "storage media") storing program instructions to perform one or more operations of subsystems 121-124. While the reverse proxy server 120 may be executed as a set of applications and scripts as a part of the cloud-supported set of servers 119, the reverse proxy server 120 may be implemented in various other ways. For example, the reverse proxy server 120 may be operated as a standalone server or a server service implemented on a first cloud system, where a second cloud system implements the destination server 140, etc. It should be understood that a "server" may be implemented as a physical machine, a virtual machine, or as software that performs server services.

In some embodiments, the set of computer systems and subsystems illustrated in FIG. 1 may include one or more computing devices having electronic storage or otherwise capable of accessing electronic storage, where the electronic storage may include the set of databases 130.

The set of databases 130 may include values used to perform operations described in this disclosure, such as data associated with digital assets, resource identifiers, user identifiers, historical records associated with users, machine learning model parameters, machine learning model outputs, etc. For example, data objects of the set of databases 130 may include names, email addresses, other off-chain identifiers, keys, values derived from keys (e.g., an on-chain address derived from a key), etc. Furthermore, the system 100 may communicate with or otherwise effect changes on blockchain system 101, as described elsewhere in this disclosure.

In some embodiments, a communication subsystem 121 may perform communication operations to send and receive messages between the reverse proxy server 120 and the destination server 140 or other computer devices accessible via the network 150, such as the payment server 106 or the client computing device 102. The communication subsystem 121 may obtain a request indicating the destination server 140 as a final destination, process requests using one or more operations described in this disclosure, and send or re-send a response corresponding with the request. For example, the communication subsystem 121 may receive a request from the client computing device 102 and parse a request into individual components such as a request method, a header, and a body.

The communication subsystem 121 may also send responses to one or more requests, where the responses may be generated by the destination server 140. For example, after receiving a response to a request from the destination server 140, some embodiments may update the response using operations described in this disclosure. Some embodiments may then send the updated response to the client computing device 102 via the network 150. As described elsewhere in this disclosure, some embodiments may have updated the response from the destination server 140 to satisfy one or more CORS-related criteria of the client computing device 102.

In some embodiments, a request filtering subsystem 122 may perform operations related to request authentication, authorization, etc. For example, the request filtering subsystem 122 may verify or authorize a request for transfer to the destination server 140 based on the host domain indicated by a request header. As described elsewhere, if the request filtering subsystem 122 indicates that a message origin of a request is identified by a whitelisted domain, the communication subsystem 121 may then directly transfer the request to the destination server 140. Alternatively, the request filtering subsystem 122 may indicate that a header identifies a domain that is not in the list of whitelisted domain names and perform operations described in this disclosure to update the header for the request such that the destination server 140 may receive the request.

In some embodiments, the request filtering subsystem 122 may obtain a request header that includes an application identifier which matches with a predetermined application, where the predetermined application may be identified based on a set of predetermined applications stored in an application configuration file. For example, the request filtering subsystem 122 may obtain a request that includes an application identifier "APP one." The request filtering subsystem 122 may then determine that the application identifier matches with a predetermined application identified as "APP one," where the predetermined application may have been identified in a list of predetermined applications stored in a configuration file. Some embodiments may then update a request header of the response or update a response to the request using operations described in this disclosure.

In some embodiments, a request update subsystem 123 may obtain a request and update a request header of the request such that the destination server 140 may receive the updated request instead of rejecting the request for being provided by a non-whitelisted origin. For example, the request update subsystem 123 may update a response header by replacing the original domain name "domain name one" with a whitelisted domain name, where the whitelisted domain name may be found in a list of whitelisted domains. As described elsewhere in this disclosure, the destination server 140 may receive requests indicated as being from a domain identified by the one or more names of the list of permitted domain names (e.g., whitelisted domain names) and provide responses to the requests. In contrast, the destination server 140 may receive requests indicated as being from a second domain and provide responses to the request.

Updating a message header to replace a domain name may include completely deleting a domain name and adding in a new domain name. For example, the request update subsystem 123 may update a request header that includes a "Host" field having the value "D1" to an updated request header having the "Host" field set to the value "D2." Alternatively, replacing a first domain name with a second domain name may include prepending the second domain name in front of the first domain name and inserting a delimiter, such as a slash "/," between the first and second domain names. For example, the request update subsystem 123 may update a request header that includes a "Host" field having the domain name "D1" to an updated request header having the "Host" field set to the domain name "D2/D1." By appending "D1" to "D2" and separating the two domain names with a slash symbol, some embodiments may cause a set of operations to treat D1 as a subdirectory of D2.

In some embodiments, the request update subsystem 123 may store a list of replaced domains in a memory, such as a memory of the set of databases 130. For example, after updating the "Host" field to replace the value "D1" with the value "D2," some embodiments may store "D2" in a record on the set of databases 130. Some embodiments may further store other information related to the domain names, such as counters associated with the number of times they are detected in requests. For example, some embodiments may increment a counter associated with the domain name "D1" based on a detection of the domain name in a header of a received request. Some embodiments may add, flag for adding, or otherwise indicate a non-permitted domain name for addition to a set of domains. For example, some embodiments may determine a count of requests from different IP addresses that indicate a particular domain as an origin domain. Based on a determination that the count of the requests exceeds a counter threshold, some embodiments may recommend the origin domain for inclusion in a record of whitelisted domains that will be permitted to be processed by a destination server without automatic rejection by the destination server.

In some embodiments, a response update subsystem 124 may update the header of a response for a request, where the response is provided by a server that received a request. For example, after receiving a modified request from the reverse proxy server 120, the destination server 140 may send a response to the modified request back to the reverse proxy server 120. The response sent by the destination server 140 may include a header having an origin backend server field that is populated with a value that identifies the destination server 140 as the origin backend server for the response. The response update subsystem 124 may update the response header of the response to change the origin backend server field to identify a different server as the origin backend server for the response. By updating the header, the response update subsystem 124 may modify the response such that the client computing device 102, upon receipt of the response, may avoid a CORS error.

As described elsewhere in this disclosure, a response header may include one or more strings that identify a domain other than the destination server 140. Some embodiments may use a domain name stored in a portion of a response header to update the field used to identify an origin server. For example, the reverse proxy server 120 may receive, from the destination server 140, a response having a response header that includes an origin backend server field that is set to the value "Source1/D1," where "D1" may be an original domain name representing the request origin. The response sent from the destination server 140 may have been sent in response to a request that was sent from the merchant server 104. After receiving the response from the destination server 140, the reverse proxy server 120 may then update the response header by changing the origin back-end server field to be set to the domain name of the merchant server 104. Once the update to the response is performed, the reverse proxy server 120 may send the updated response to the client computing device 102.

Figure 2:
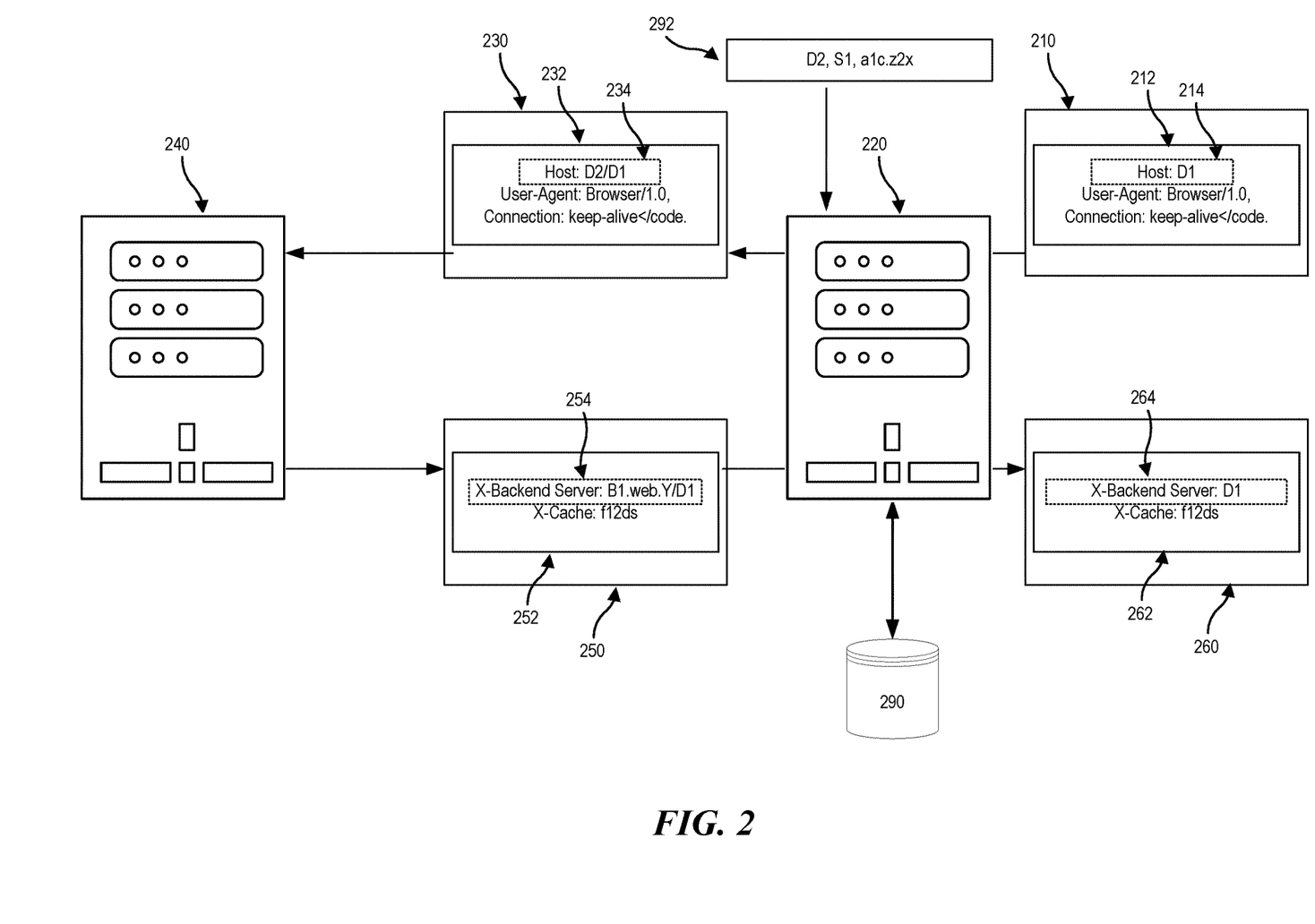
FIG. 2 depicts example modification to response headers, in accordance with some embodiments.

FIG. 2 depicts example modification to response headers, in accordance with some embodiments. A computing system may send an initial request 210 having an initial request header 212 with an intended destination being the destination server 240. The reverse proxy server 220 intercepts the initial request 210 and may update the initial request 210 by replacing or otherwise modifying an initial request header field 214 of the initial request header 212. After modifying the initial request header field 214 into a modified request header field 234 of a modified request header 232 of a modified request 230, the reverse proxy server 220 may send the modified request 230 to a destination server 240. Some embodiments may use a list of permitted domain names 292 to determine a domain name to use when replacing the initial request header field 214. Alternatively, or additionally, some embodiments use a preset default domain name, such as the domain name assigned to the destination server 240.

As can be seen by comparing the values for the initial request header field 214 and the modified request header field 234, some embodiments may update the initial request header field 214 to include the original value of the initial request header field 214. For example, the value for the initial request header field 214, "D1", may be included in the string value "d2/D1" for the modified request header field 234. The destination server 240 may use this information to retain the value "D1" in an initial response 250 to the modified request 230, where the initial response 250 may have an initial response header 252. For example, as can be seen in the initial response 250, the initial response header field 254 of the initial response header 252 may be set to the string value "B1/D1." The reverse proxy server 220 may then modify the initial response 250 by changing the string value assigned to the initial response header field 254 to the value "D1" by removing the prepended "B1" and removing the slash "/." This new value "D1" may be assigned to a modified response header field 264 of a modified response header 262 for a modified response 260. By initially updating the host domain name in the initial request header 212 to retain "D1" in the modified request header 232, the reverse proxy server 220 is able to preserve host server information directly in a modified request. The destination server 240 is thus able to use this preserved information to generate the initial response 250 based on the modified request 230 such that the initial response 250 includes this initial host domain name.

In some embodiments, the reverse proxy server 220 may communicate with a database 290, where the database 290 may be a database of the set of databases 130 or may be a different database. The reverse proxy server 220 may store information related to a request origin domain in the database 290, such as information stored in the initial request header 212, information obtained from a request body of the initial request 210, or other information associated with the initial request 210 (e.g., a time of request arrival to the reverse proxy server 220, a category assigned to the initial request 210, etc.). For example, after receiving the initial request 210, the reverse proxy server 220 may store the value "D1" of the initial request header field 214 in the database 290 in association with a message identifier provided by or assigned to the initial request 210. In some embodiments, the database 290 may count the number of times that a header field value is stored. In response to a determination that a counter threshold is satisfied by the count, some embodiments may then indicate that the header field value associated with the count should be added to a list of permitted domain names.

Figure 3:
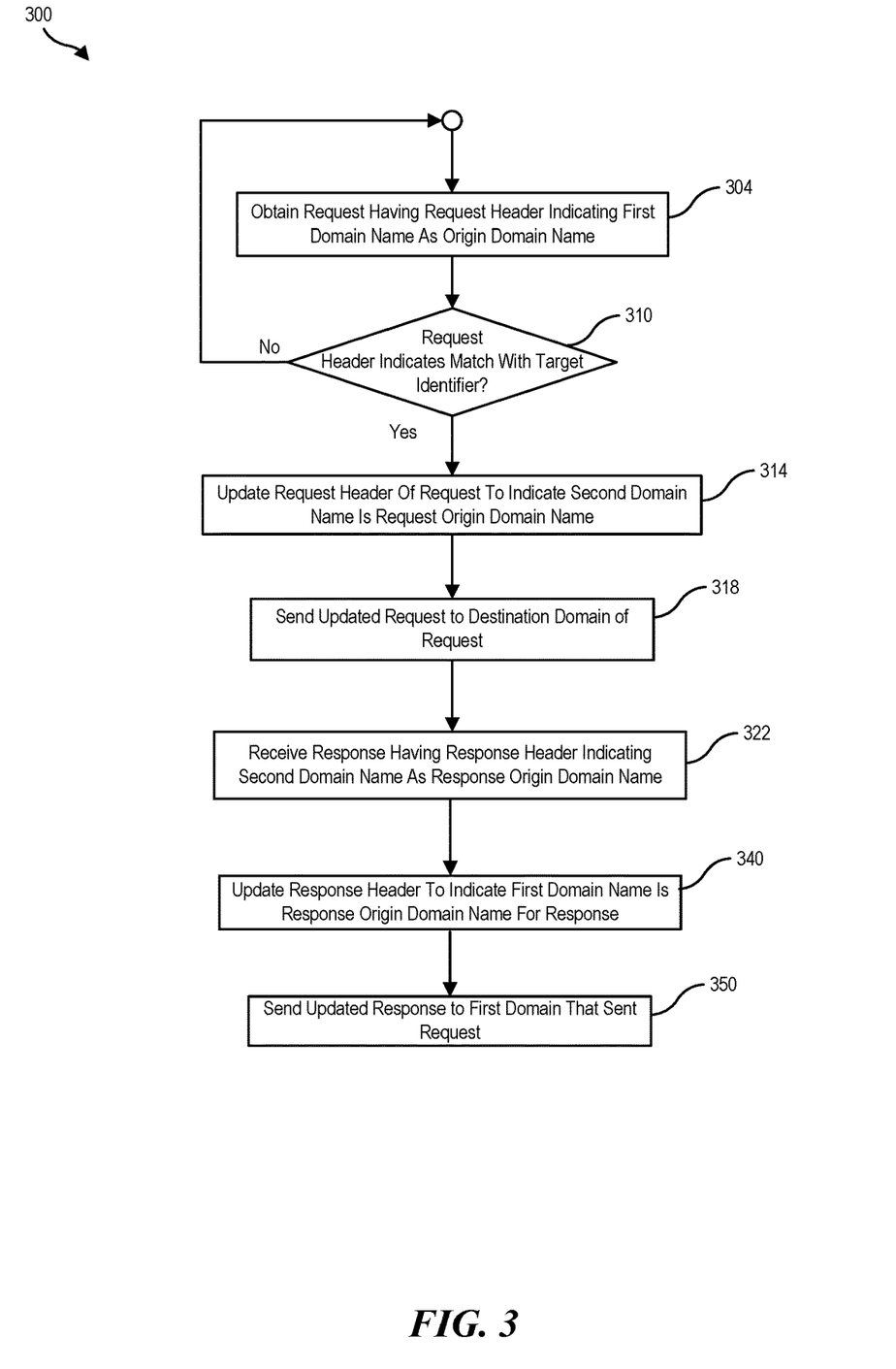
FIG. 3 shows a flowchart of a process for modifying message headers, in accordance with one or more embodiments.

FIG. 3 shows a flowchart of a process for modifying message headers, in accordance with one or more embodiments. Some embodiments may obtain a request having a request header indicating a first domain name as the origin domain name, as indicated by block 304. Some embodiments may use a reverse proxy server to intercept messages headed for a destination back-end server, where the reverse proxy server may be implemented as a proxy server application. For example, some embodiments may execute a proxy server application using a cloud computing service to intercept requests addressed to a set of domains. Furthermore, a proxy server application may receive a plurality of requests, and some embodiments may update the computing resource allocation (e.g., memory, available processors, etc.) for the proxy server application to scale with the computational cost of performing operations by the process 300 for the plurality of requests. For example, some embodiments may concurrently receive 10,000 requests or responses, determine that a memory cost of processing the 10,000 requests or responses exceeds a computational cost threshold and, in response, increase the memory allocated to the proxy server application. Alternatively, or additionally, some embodiments may activate an additional instance of the proxy server application to process a portion of the requests or responses.

A request origin domain name is an identifier of the origin domain indicated to have sent the request, where the identifier may be a domain name. For example, some embodiments may receive a request having a request header that includes a request header field "host," where the value assigned to "Host" is a request origin domain name. In many cases, a domain name that includes one or more slash symbols may be interpreted as indicating that the first portion of the domain name is a true domain name identifying the request origin, where information following the first slash may be ignored or used in other contexts. For example, some embodiments may receive a request having a request header field "Host" set to a value "A1/A2/A3" and may store "A1" as the domain name representing the request origin for the request.

Some embodiments may use the reverse proxy server to determine whether the request includes a user identifier or a request token and reject the request if it does not satisfy one or more criteria based on the user identifier or the request token. For example, some embodiments may receive, at a reverse proxy server, a request having a user identifier and a request token. Some embodiments may then detect whether the request token matches a stored authorization token associated with the user identifier (e.g., an authorization token stored in a data structure that has a key value equal to the user identifier). Alternatively, or additionally, some embodiments may determine whether a value derived from the request token matches with the authorization token. As used in this disclosure, a first value may be derived from the second value using one or more operations, such as hashing operations, encryption operations, arithmetic operations (e.g., addition, multiplication), other mathematical operations, etc.

As described elsewhere in this disclosure, a client computing device may cause a set of operations that causes a first server to send a first request to a destination server and also causes a second server to send a related request to the destination server, where the first server may be a permitted server and the second server may be a non-permitted server. Some embodiments may use a reverse proxy server to receive the request to first determine whether the request is provided by a permitted server or a non-permitted server. Some embodiments may use the reverse proxy server to perform an initial set of message validation operations to determine whether the received request satisfies a set of validation criteria. For example, some embodiments may perform operations to reject a request if the request includes values, sequences of characters, or program code associated with malicious activity.

Some embodiments may detect whether the request header indicates a match with a target identifier, as indicated by block 310. The target identifier may be a target application identifier, where the request header may include a request header field that has a value equal to the target application identifier. For example, some embodiments may receive a request having a request header that includes an identifier field having the value "APP01." Some embodiments may retrieve information from an application configuration file and determine that the value "APP01" matches with a target application identifier stored in the application configuration file. In response to detecting that the request header matches with a target identifier, some embodiments may proceed to operations described by block 314. Otherwise, operations of the process 300 may reject the request or perform other operations to indicate that the request does not satisfy a set of criteria associated with header modification operations and return to performing operations described by block 304 for a new request.

Some embodiments may update a request header of the request to indicate that a second domain name is the request origin domain name, as indicated by block 314. Some embodiments may use a request proxy server to update the request header by replacing one or more fields of the request header with different values. For example, some embodiments may receive a request having a request header that includes a request header field "Host," where the value assigned to "Host" represents a request origin domain. If the request header field "Host" has a value equal to "D1," some embodiments may treat "D1" as the request origin domain name. As described elsewhere in this disclosure, such header values may interfere with processing transactions because an initial request may be sent by an initial server "A1" that is permitted (e.g., "A1" is stored in a list of whitelisted domain names). However, the initial request may then be followed up by a second request sent from the server identified as "D1" due to CORS activity in the second request, where such CORS activity may be performed by transactions between a client computing device and the servers "A1" and "D1." Without further processing, such operations may result in a CORS-related error because a destination server for the request would not accept non-permitted message origins such as "D1."

Some embodiments may replace a header field having an initial value with a new value that incorporates the initial value. For example, some embodiments may replace a "Host" field having a value "D1" with a second value "D2/D1," where D2 may be a permitted domain name that is set as a default domain name or is selected from a set of whitelisted domain names. By appending "D1" to "D2" and using a "/" to separate the two domain names, some embodiments may change the indicated origin identifier to the domain name "D2" without losing the actual identifier "D1." By including the initial value into the replacement value for "host," some embodiments may provide downstream request processing operations with a means of modifying a response based on the initial field value. Alternatively, or additionally, some embodiments may store an initial value of a first header field into a second header field when updating the header. For example, some embodiments may receive a request having a first request header field "Host" set to a value "E1" and may set a second request header field "true host" with the value "E1" during a request update operation, where the request update operation also include replacing the value "E1" with the value "E2" for the first request header field "Host."

Some embodiments may replace a header field with a new value that does not include an initial value of the header field without storing the initial value of the header field in a different location of the header. For example, some embodiments may replace a "Host" field having a first value "D1" with a second value "D2" without storing the first value "D1" in the request header. Some embodiments may remain capable of retrieving the first value "D1" by first storing the value "D1" in a data structure and then retrieving the value "D1" from the data structure when updating a response corresponding with the request to include the value "D1." For example, some embodiments may store the first value "D1" in a record of a database. As described elsewhere in this disclosure, some embodiments may retrieve a stored request origin domain name from a database or other data structure when updating a response.

Some embodiments may limit the amount of time that a domain name is stored in a data structure. For example, some embodiments may store a request origin domain name in a cache memory in association with a request identifier, where the cache memory may provide the domain name quicker than other types of memory. Some embodiments may then determine whether an amount of time that a request origin domain name is stored in memory exceeds a cache time threshold. In response to a determination that the amount of time exceeds the cache time threshold, some embodiments may then delete the request origin domain name from the data structure. By deleting domain names that have been stored for so long that they satisfy a time threshold, some embodiments may free up the available storage for memories capable of providing faster data retrieval.

Some embodiments may replace a header field using one or more encryption operations by encrypting a domain name. For example, when replacing a first domain name of a "Host" field, some embodiments may perform operations to encrypt the first domain name into a first encrypted form. Some embodiments may encrypt the first domain name using encryption methods such as the Advanced Encryption Standard (AES) method, Rivest-Shamir-Adleman (RSA) method, Blowfish method, or Elliptic Curve Cryptography (ECC) method. By encrypting a domain name, some embodiments increase the privacy/protection of a user.

Some embodiments may send the updated request to a destination domain of the request, as indicated by block 318. Some embodiments may use the reverse proxy server to update a request and then send the updated request to a destination server. As described elsewhere in this disclosure, the destination server may be configured to receive requests from itself or a server identified by a domain name of a set of whitelisted domain names. By updating the request, some embodiments may permit the destination server to accept the updated request, where the destination server may have rejected the request if it was not updated. For example, the destination server may determine whether the updated request satisfies a set of server-side CORS security criteria that includes a server-side CORS security criterion that all requests be provided from the destination server itself. Alternatively, the set of server-side CORS security criteria may require that incoming requests be provided by servers identified by a list of whitelisted domain names.

Some embodiments may enforce one or more additional criteria before sending an updated request. For example, some embodiments may require that a portion of a body of a request match a specified pattern in order to prevent a destination server from receiving malicious or erroneous instructions. As described in this disclosure, a portion of a body may include the entirety of the body. The specified pattern may include one of a set of specified patterns and may be categorized with one or more permitted activity types. For example, some embodiments may detect whether some or all of a body of a request matches a pattern indicating a database transaction or another type of transaction, where the pattern may include a combination of data types and database operations. In response to a determination that a portion of a request body of a request matches a permitted pattern (e.g., a pattern indicating a transaction), some embodiments may send an updated request to a destination server. Alternatively, in response to a determination that the request body of a request does not match any permitted patterns, some embodiments may reject the request and not send the request to the destination server.

Some embodiments may select a specific domain from a set of available destinations, where the specific domain may be a subdomain of a main domain. For example, some embodiments may determine a target destination domain based on an application identifier stored in a request header field, where the target destination domain includes an application identified by the application identifier. Alternatively, or additionally, some embodiments may first assign a category to a request based on a request header of the request or a body of the request and select a target domain name based on the assigned category. In some embodiments, a reverse proxy server may first select a target domain having a first domain name and update a received request to indicate the first domain name as the domain identifier for the request origin domain. For example, a reverse proxy server may select a target domain "D5" based on a determination that a request header field has an identifier "application-for-D5." Some embodiments may then update the request header of the request such that an identified origin domain name of the request is modified from "D1" to "D5/D1."

Some embodiments may receive a response having a response header indicating the second domain name as a response origin domain name, as indicated by block 322. A response origin domain name is an identifier of the origin domain indicated to have sent the response, where the identifier may be a domain name. For example, some embodiments may receive a response having a response header which includes a response header field "X-Backend Server," where the value assigned to "X-Backend Server" is a response origin domain name. Furthermore, while some embodiments may use the same proxy server (e.g., a same physical server device or a same proxy server application) to receive/update requests or receive/update responses, some embodiments may use separate proxy servers. For example, in some embodiments, a first reverse proxy server may receive requests and update request headers and a second reverse proxy server may receive and update the responses for the requests.

While some embodiments may receive a response that indicates the same domain name as the domain name used to replace a request origin domain name, some embodiments may receive a response that indicates a different response origin domain name. For example, after a reverse proxy server sends a request that was updated to indicate that the request origin domain name is "D2," some embodiments may receive a response to the request, where a response header of the request may indicate that the response origin domain name is "D3." Furthermore, some embodiments may keep an initial domain name provided in a request before the request was modified by the reverse proxy server. For example, after a reverse proxy server sends a request that was updated to indicate that the request origin domain name is "D2/D1," some embodiments may receive a response to the request, where a response header of the request may indicate that the response origin domain name is "D3/D1."

Some embodiments may update the response header of the response to indicate that the first domain name is the response origin domain name for the response, as indicated by block 340. Some embodiments may use a reverse proxy server to update the response header to indicate the first domain name. As described elsewhere in this disclosure, some embodiments may receive a response that includes the first domain name in the response header. For example, a reverse proxy server may receive a response having a response header field that includes the first domain name and a set of characters in a position prepending the first domain name, where the set of characters may represent the response origin domain name. For example, the first domain name is "D1" and may be used in a request header of a request that was received by a reverse proxy server that then updated the request to set the "Host" header field to the value "D2/D1," where "D2" is the domain name of the destination server for the request (and thus will be accepted by the destination server).

The reverse proxy server may then receive a response from the destination server that has a response header field "X-Backend Server" representing a response origin domain name, where "X-Backend Server" may be set to the value "D2/D1," thus setting the response origin domain name to the value "D2/D1."

Furthermore, as described elsewhere in this disclosure, some embodiments may have encrypted a domain name of a request header. When replacing a response header field indicating a response origin domain name, some embodiments may then decrypt the encrypted form of the domain name and use the decrypted domain name to replace response origin domain name. For example, some embodiments may receive a response having "X-Backend Server" set to "D2/[ENCRYPTED01]," decrypt "[ENCRYPTED01]" to the value "B1," and update "X-Backend Server" to the value "B1."

Some embodiments may perform an initial operation to determine whether the response is associated with the first domain name. For example, some embodiments may determine, based on if an identifier is stored in the header, whether the response is associated with a domain name stored in a data structure that may be retrieved using the identifier. For example, a reverse proxy server may receive a response that includes a request identifier and, in response, search a data structure based on the identifier to retrieve a request origin domain name associated with the request identifier. If the reverse proxy server finds the request origin domain name, the reverse proxy server may determine that the response is associated with the first domain name, where the request origin domain name is the first domain name.

Some embodiments may send the updated response to the origin server of the request, as indicated by block 350. As described elsewhere, some embodiments may receive a request that indicates an original domain name as the identifier of the request origin. After updating a response by changing the indicated response origin domain name to the original domain name in the response header, a reverse proxy server may send the updated response to a client computing device. Once the client computing device receives the updated response, the client computing device may determine whether the updated response satisfies a set of client-side criteria. In many cases, the set of client-side criteria includes a criterion based on the original domain name, such as a criterion requiring that the response indicate the original domain name as the response origin. For example, after receiving the updated response, the client computing device may determine that the updated response satisfies the set of client-side criteria based on a determination that a response header field of the updated response indicates the original domain name as the response origin domain name.

Some embodiments may perform operations of the process 300 for multiple requests having different request origin domains. For example, some embodiments may use a reverse proxy server to perform operations of the process 300 for a first request provided by a first server, obtain a first response to the first request from a destination server, and modify the header of the first response based on an identifier of the first server. The reverse proxy server may concurrently perform operations of the process 300 for a second request indicating a different domain name as a request origin domain name, where the reverse proxy server may send an updated version of the second request to a destination server.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for the execution of one or more of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 121-124 may provide more or less functionality than is described. For example, one or more of subsystems 121-124 may be eliminated, and some or all of its functionality may be provided by other ones of subsystems 121-124. As another example, additional subsystems may be programmed to perform some or all of the functionality attributed herein to one of subsystems 121-124 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

ENUMERATED EMBODIMENTS

The present techniques will be better understood with reference to the following enumerated embodiments:

1. A method comprising: obtaining, from a client computing device, a request comprising a request header, wherein the request header comprises a request header field that comprises an original domain name indicating an origin domain of the request; based on a determination that the request header comprises an application identifier matches a predetermined application retrieved from a set of predetermined applications stored in an application configuration file, updating the request by replacing the original domain name of the request header field with a permitted domain name; sending the updated request to a server, wherein the server determines that a server-side CORS security criterion is satisfied based on the permitted domain name; receiving, from the server, a response comprising a response header, wherein the response header comprises a response header field comprising the permitted domain name; based on a determination that the response is associated with the original domain name, updating the response by replacing the permitted domain name of the response header field with the original domain name as the origin domain of the response; and sending, to the client computing device, the updated response to the client computing device, wherein the client computing device determines that a set of client-side criteria is satisfied based on the original domain name of the response header field.

2. A method comprising: obtaining, from a client computing device, a request comprising a request header; based on a detection that the request comprises a target identifier matching an application identifier, updating the request by replacing the first domain name of the request header field with a second domain name; sending the updated request to a server; receiving, from the server, a response comprising a response header; updating the response by replacing the second domain name of the response header field with the first domain name to present the first domain name as an origin domain; and sending, to the client computing device, the updated response to the client computing device.

3. The method of embodiment 2, wherein the request header comprises a request header field that comprises a first domain name.

4. The method of any of embodiments 2 to 3, wherein the response header comprises a response header field that comprises the second domain name.

5. A method comprising: obtaining, from a client computing device, a request comprising a request header field that is populated with a first domain name; updating the request by modifying the request header field to comprise a second domain name; sending the updated request to a server; receiving a response comprising a response header; updating the response by modifying a response header field of the response header to indicate the first domain name as an origin domain of the response; and sending the updated response to the client computing device.

6. The method of any of embodiments 1 to 5, wherein replacing the first domain name of the request header field with the second domain name comprises appending the first domain name to the second domain name such that the first domain name is a subdirectory of the second domain name.

7. The method of any of embodiments 1 to 6, wherein: the request comprises a user identifier and a request token; and sending the updated request to the server comprises sending the updated request to the server in response to a detection that the request token or a value derived from the request token matches a stored authorization token associated with the user identifier.

8. The method of any of embodiments 1 to 7, wherein replacing the first domain name of the request header field comprises replacing the first domain name of the request header field in response to a detection that a list of whitelisted domain names comprises the first domain name.

9. The method of embodiment 8, wherein the request is a first request, further comprising: obtaining a second request comprising a second request header field that is populated with a third domain name; and sending a version of the second request to the server, wherein a header field of the version of the second request sent to the server indicates the third domain name as the origin domain of the second request.

10. The method of any of embodiments 1 to 9, further comprising storing the first domain name in a data structure in association with a request identifier, wherein replacing the second domain name of the response header field comprises retrieving the first domain name from the data structure.

11. The method of any of embodiments 1 to 10, wherein: replacing the first domain name of the request header field comprises encrypting the first domain name into an encrypted form; and replacing the second domain name of the response header field comprises decrypting the encrypted form into the first domain name.

12. The method of any of embodiments 1 to 11, wherein sending the updated request comprises sending the updated request to the server based on a determination that a portion of a body of the request matches a pattern indicating a transaction.

13. The method of embodiment 12, wherein the request is a first request, the body is a first body, the portion is a first portion, further comprising rejecting a second request based on a determination that a second portion of a second body of the second request does not match the pattern.

14. The method of any of embodiments 1 to 13, wherein updating the response comprises determining that the response header comprises the first domain name, the operations further comprising removing the second domain name from the response header and leaving the first domain name in the response header.

15. The method of any of embodiments 1 to 14, wherein: the response header field comprises the first domain name and a set of characters in a position prepending the first domain name; and removing the set of characters from the position prepending the first domain name.

16. The method of any of embodiments 1 to 15, wherein the request is a first request, further comprising: receiving an initial request, wherein a header of the initial request identifies a third domain name as an origin domain name of the initial request; caching an identifier provided by the initial request based on a determination that a list of whitelisted domain names comprises the third domain name; and updating the first request comprises updating the request based on a determination that a value provided by the first request matches the identifier.

17. The method of any of embodiments 1 to 16, the operations further comprising: storing the first domain name in a data structure in association with a request identifier, wherein modifying the response header field comprises retrieving the first domain name from the data structure; and based on a determination that the first domain name satisfies a cache time threshold associated with the first domain name in the data structure, deleting the first domain name from the data structure.

18. The method of any of embodiments 1 to 17, the operations further comprising: determining a target destination domain based on the request; and selecting a target domain name based on the target destination domain of the request, wherein the target domain name is the second domain name.

19. The method of any of embodiments 1 to 18, the operations further comprising: incrementing a counter associated with the first domain name based on a detection of the first domain name in the request; based on a determination that the counter satisfies a counter threshold, updating a record of whitelisted domains to comprise the first domain name.

20. The method of any of embodiments 1 to 19, the operations further comprising: obtaining an application identifier from a request header of the request; retrieving a pattern associated with the application identifier in a data structure; and wherein updating the request comprises updating the request based on a determination that at least a portion of a request body of the request matches the pattern.

21. The method of any of embodiments 1 to 20, wherein: obtaining the request comprises obtaining the request at a proxy server application; and the server is a first server, and wherein sending the updated request to the first server comprises sending the updated request from the proxy server application.

22. The method of embodiment 21, wherein a plurality of requests comprises the request, the operations further comprising increasing a computing resource allocation for the proxy server application in response to a determination that a computational cost of the plurality of requests exceeds a computational cost threshold.

23. One or more tangible, non-transitory, machine-readable media storing instructions that, when executed by a set of processors, cause the set of processors to effectuate operations comprising those of any of embodiments 1 to 22.

24. A system comprising: a set of processors and memory storing computer program instructions that, when executed by the set of processors, cause the set of processors to effectuate operations comprising those of any of embodiments 1 to 22.

What is claimed is:

1. A system for reducing a cross-origin resource sharing (CORS) errors by updating header fields indicating an origin domain, the system comprising a set of processors and a memory storing program instructions that, when executed by the set of processors, performs operations comprising:
    obtaining, from a client computing device, a request comprising a request header, wherein the request header comprises a request header field that comprises an original domain name indicating an origin domain of the request;
    based on a determination that the request header comprises an application identifier matching a predetermined application retrieved from a set of predetermined applications stored in an application configuration file, updating the request by replacing the original domain name of the request header field with a permitted domain name;
    sending the updated request to a server, wherein the server determines that a server-side CORS security criterion is satisfied based on the permitted domain name;
    receiving, from the server, a response comprising a response header, wherein the response header comprises a response header field comprising the permitted domain name;
    based on a determination that the response is associated with the original domain name, updating the response by replacing the permitted domain name of the response header field with the original domain name as the origin domain of the response; and
    sending, to the client computing device, the updated response to the client computing device, wherein the client computing device determines that a set of client-side criteria is satisfied based on the original domain name of the response header field.

2. A method comprising:
    obtaining, from a client computing device, a request comprising a request header, wherein the request header comprises a request header field that comprises a first domain name;
    based on a detection that the request comprises a target identifier matching an application identifier, updating the request by replacing the first domain name of the request header field with a second domain name;

sending the updated request to a server;
receiving, from the server, a response comprising a response header, wherein the response header comprises a response header field that comprises the second domain name;
updating the response by replacing the second domain name of the response header field with the first domain name to present the first domain name as an origin domain; and
sending, to the client computing device, the updated response to the client computing device.

3. The method of claim 2, wherein replacing the first domain name of the request header field with the second domain name comprises appending the first domain name to the second domain name such that the first domain name is a subdirectory of the second domain name.

4. The method of claim 2, wherein:
the request comprises a user identifier and a request token; and
sending the updated request to the server comprises sending the updated request to the server in response to a detection that the request token or a value derived from the request token matches a stored authorization token associated with the user identifier.

5. The method of claim 2, wherein replacing the first domain name of the request header field comprises replacing the first domain name of the request header field in response to a detection that a list of whitelisted domain names comprises the first domain name.

6. The method of claim 5, wherein the request is a first request, further comprising:
obtaining a second request comprising a second request header field that is populated with a third domain name; and
sending a version of the second request to the server, wherein a header field of the version of the second request sent to the server indicates the third domain name as the origin domain of the second request.

7. The method of claim 2, further comprising storing the first domain name in a data structure in association with a request identifier, wherein replacing the second domain name of the response header field comprises retrieving the first domain name from the data structure.

8. The method of claim 2, wherein:
replacing the first domain name of the request header field comprises encrypting the first domain name into an encrypted form; and
replacing the second domain name of the response header field comprises decrypting the encrypted form into the first domain name.

9. The method of claim 2, wherein sending the updated request comprises sending the updated request to the server based on a determination that a portion of a body of the request matches a pattern indicating a transaction.

10. The method of claim 9, wherein the request is a first request, the body is a first body, the portion is a first portion, further comprising rejecting a second request based on a determination that a second portion of a second body of the second request does not match the pattern.

11. A set of non-transitory, machine-readable media that, when executed by a set of processors, causes the set of processors to perform operations comprising:
obtaining, from a client computing device, a request comprising a request header, wherein the request header comprise a request header field that comprises a first domain name;
based on a detection indicating that the request comprises a target identifier matching an application identifier, updating the request by replacing the first domain name of the request header field with a second domain name;
sending the updated request to a server;
receiving, from the server a response comprising a response header, wherein the response header comprises a response header field that comprises the second domain name;
updating the response by replacing the second domain name of the response header field with the first domain name to present the first domain name as an origin domain; and
sending, to the client computing device, the updated response to the client computing device.

12. The set of non-transitory, machine-readable media of claim 11, wherein updating the response comprises determining that the response header comprises the first domain name, wherein replacing the second domain name comprises replacing the second domain name based on a result indicating that the response header comprises the first domain name.

13. The set of non-transitory, machine-readable media of claim 11, wherein:
the response header field comprises the first domain name and a set of characters in a position prepending the first domain name; and
removing the set of characters from the position prepending the first domain name.

14. The set of non-transitory, machine-readable media of claim 11, wherein the request is a first request, further comprising:
receiving an initial request, wherein a header of the initial request identifies a third domain name as an origin domain name of the initial request;
caching an identifier provided by the initial request based on a determination that a list of whitelisted domain names comprises the third domain name; and
updating the first request comprises updating the request based on a determination that a value provided by the first request matches the identifier.

15. The set of non-transitory, machine-readable media of claim 11, the operations further comprising:
storing the first domain name in a data structure in association with a request identifier, wherein modifying the response header field comprises retrieving the first domain name from the data structure; and
based on a determination that the first domain name satisfies a cache time threshold associated with the first domain name in the data structure, deleting the first domain name from the data structure.

16. The set of non-transitory, machine-readable media of claim 11, the operations further comprising:
determining a target destination domain based on the request; and
selecting a target domain name based on the target destination domain of the request, wherein the target domain name is the second domain name.

17. The set of non-transitory, machine-readable media of claim 11, the operations further comprising:
incrementing a counter associated with the first domain name based on a detection of the first domain name in the request; and
based on a determination that the counter satisfies a counter threshold, updating a record of whitelisted domains to comprise the first domain name.

18. The set of non-transitory, machine-readable media of claim 11, the operations further comprising:
   obtaining the application identifier from the request header; and
   retrieving a pattern associated with the application identifier in a data structure,
   wherein updating the request comprises updating the request based on a determination that at least a portion of a request body of the request matches the pattern.

19. The set of non-transitory, machine-readable media of claim 11, wherein:
   obtaining the request comprises obtaining the request at a proxy server application; and
   the server is a first server, and wherein sending the updated request to the first server comprises sending the updated request from the proxy server application.

20. The set of non-transitory, machine-readable media of claim 19, wherein a plurality of requests comprises the request, the operations further comprising increasing a computing resource allocation for the proxy server application in response to a determination that a computational cost of the plurality of requests exceeds a computational cost threshold.

* * * * *